(12) United States Patent
Karakotsios et al.

(10) Patent No.: US 9,317,113 B1
(45) Date of Patent: Apr. 19, 2016

(54) GAZE ASSISTED OBJECT RECOGNITION

(75) Inventors: Kenneth M. Karakotsios, San Jose, CA (US); Isaac S. Noble, Soquel, CA (US)

(73) Assignee: Amazon Technologies, Inc., Reno, NV (US)

( * ) Notice: Subject to any disclaimer, the term of this patent is extended or adjusted under 35 U.S.C. 154(b) by 270 days.

(21) Appl. No.: 13/485,195

(22) Filed: May 31, 2012

(51) Int. Cl.
*G06F 3/01* (2006.01)
*G02B 27/01* (2006.01)

(52) U.S. Cl.
CPC ........ *G06F 3/013* (2013.01); *G02B 2027/0138* (2013.01)

(58) Field of Classification Search
CPC ........... G06F 3/01; G06F 3/011; G06F 3/012; G06F 3/013; G06F 3/017; G06F 3/048–3/04842; G06K 9/00221; G06K 9/00248; G06K 9/00281; G06K 9/00335; G06K 9/00362; G02B 27/0093; G02B 27/01; G02B 27/0101; G02B 27/0103; G02B 27/0149; G02B 27/017; G02B 27/0172; G02B 27/0176; G02B 27/0179; G02B 27/0189; G02B 2027/01; G02B 2027/0101; G02B 2027/0138; G02B 2027/014; G02B 2027/0149; G02B 2027/0154; G02B 2027/0156; G02B 2027/0159; G02B 2027/017; G02B 2027/0172
USPC .......... 345/7–9, 156–158, 419, 633; 351/209; 359/630; 382/103; 715/784
See application file for complete search history.

(56) References Cited

U.S. PATENT DOCUMENTS

| | | |
|---|---|---|
| 5,850,211 A | 12/1998 | Tognazzini |
| 6,959,102 B2 | 10/2005 | Peck |
| 7,092,554 B2 | 8/2006 | Chen et al. |
| 7,199,767 B2 | 4/2007 | Spero |
| 8,064,647 B2 | 11/2011 | Bazakos |
| 8,643,680 B2 | 2/2014 | Baldwin et al. |
| 8,644,565 B2 | 2/2014 | Du et al. |
| 8,942,434 B1 | 1/2015 | Karakotsios et al. |
| 8,947,351 B1 | 2/2015 | Noble |
| 2002/0180799 A1 | 12/2002 | Peck et al. |
| 2003/0046080 A1 | 3/2003 | Hejna |
| 2003/0142068 A1 | 7/2003 | DeLuca |
| 2004/0174496 A1 | 9/2004 | Ji et al. |
| 2004/0190759 A1 | 9/2004 | Caldwell |
| 2005/0133693 A1 | 6/2005 | Fouquet et al. |
| 2005/0175218 A1 | 8/2005 | Vertegaal et al. |
| 2005/0207614 A1 | 9/2005 | Schonberg et al. |
| 2005/0248529 A1 | 11/2005 | Endoh |

(Continued)

OTHER PUBLICATIONS

"Final Office Action dated Jun. 3, 2013", U.S. Appl. No. 13/083,303, 17 pages.

(Continued)

*Primary Examiner* — Nathan Danielsen
(74) *Attorney, Agent, or Firm* — Novak Druce Connolly Bove + Quigg LLP (57) ABSTRACT

An electronic device can attempt to determine a gaze direction of a user, which can be used to determine an object of interest to the user. Determining the gaze direction helps to reduce the search space and reduce processing requirements for identifying the object. Image information can be captured that includes the object of interest, which then can be analyzed to recognize the type of object. Upon recognizing the object, the user can be provided with information about the object, which in some cases can depend at least in part upon a current context or location of the object. If the object is a networked device, the user can potentially be provided with input options for controlling the device.

27 Claims, 8 Drawing Sheets

(56) References Cited

U.S. PATENT DOCUMENTS

| | | |
|---|---|---|
| 2006/0077347 A1 | 4/2006 | Liang et al. |
| 2006/0109238 A1 | 5/2006 | Lau et al. |
| 2006/0109422 A1 | 5/2006 | Clark et al. |
| 2006/0147094 A1 | 7/2006 | Yoo |
| 2006/0256133 A1 | 11/2006 | Rosenberg |
| 2006/0257026 A1 | 11/2006 | Shiffer et al. |
| 2006/0269105 A1 | 11/2006 | Langlinais |
| 2007/0025598 A1 | 2/2007 | Kobayashi et al. |
| 2007/0189582 A1 | 8/2007 | Hamza et al. |
| 2008/0122803 A1 | 5/2008 | Izadi et al. |
| 2008/0134093 A1 | 6/2008 | Dharmarajan et al. |
| 2008/0170759 A1 | 7/2008 | Monro |
| 2008/0253622 A1 | 10/2008 | Tosa et al. |
| 2009/0022368 A1* | 1/2009 | Matsuoka et al. ............ 382/103 |
| 2009/0115966 A1 | 5/2009 | Waldorf et al. |
| 2009/0196460 A1 | 8/2009 | Jakobs et al. |
| 2009/0210388 A1 | 8/2009 | Elson et al. |
| 2010/0002912 A1 | 1/2010 | Solinsky |
| 2010/0014718 A1 | 1/2010 | Savvides et al. |
| 2010/0014720 A1 | 1/2010 | Hoyos et al. |
| 2010/0066676 A1 | 3/2010 | Kramer et al. |
| 2010/0097332 A1 | 4/2010 | Arthur et al. |
| 2010/0125816 A1 | 5/2010 | Bezos |
| 2011/0006978 A1 | 1/2011 | Yuan |
| 2011/0026014 A1 | 2/2011 | Mack et al. |
| 2011/0128223 A1 | 6/2011 | Lashina et al. |
| 2011/0128365 A1 | 6/2011 | Ren et al. |
| 2011/0141436 A1 | 6/2011 | Ono |
| 2011/0221793 A1* | 9/2011 | King et al. .................... 345/690 |
| 2011/0234386 A1* | 9/2011 | Matsuda .................... 340/12.54 |
| 2012/0075168 A1* | 3/2012 | Osterhout et al. ................ 345/8 |
| 2012/0086629 A1 | 4/2012 | Thorn |
| 2012/0109923 A1* | 5/2012 | Pasquero et al. .............. 707/706 |
| 2012/0206333 A1 | 8/2012 | Kim |
| 2013/0293530 A1 | 11/2013 | Perez et al. |

OTHER PUBLICATIONS

"International Preliminary Examination Report on Patentability dated Oct. 17, 2013", International Application PCT/US2012/032148, 5 pages.

"International Search Report dated Jul. 26, 2012", International Application PCT/US2012/032148, 7 pages.

"Non Final Office Action dated Nov. 7, 2013", U.S. Appl. No. 13/246,561, 18 pages.

"Non Final Office Action dated Dec. 6, 2012", U.S. Appl. No. 13/083,303, 16 pages.

"Notice of Allowance dated Aug. 14, 2013", U.S. Appl. No. 13/083,303, 6 pages.

Faceshift Documentation: Faceshift Studio Beta, http://www.faceshift.com/help/studio/beta/,2012.

Final Office Action mailed Oct. 23, 2013; in corresponding U.S. Appl. No. 12/786,297.

Non-Final Office Action mailed Mar. 28, 2013; in corresponding U.S. Appl. No. 12/786,297.

Cappelletta, Luca et al. ; "Phoneme-To-Viseme Mapping for Visual Speech Recognition", Department of Electronic and Electrical Engineering, Trinity College Dublin, Ireland, 2012.

Cornell, Jay, "Does This headline Know You're Reading It?" h+ magazine, located at http://hplusmagazine.com/articles/ai/does-headline-know-you%E2%80%99re-reading-it>, last accessed on Jun. 7, 2010. Mar. 19, 2010.

Van Den Berg,; "Near Infrared Light Absorption in the Human Eye Media", Vision Res., vol. 37, No. 2, 1997, pp. 249-253.

Non-Final Office Action mailed Apr. 7, 2014; in corresponding U.S. Appl. No. 13/332,128.

Final Office Action mailed May 28, 2014; in corresponding U.S. Appl. No. 13/246,561.

\* cited by examiner

GAZE ASSISTED OBJECT RECOGNITION

BACKGROUND

Electronic devices are increasingly able to provide various types of information and perform various tasks. For example, a user wanting to obtain information about a book can capture an image of the cover of the book and upload that image to a book identification service for analysis. In many cases, the user must actively focus a camera of the device on the object of interest and make that object occupy a majority of the image. Such an approach requires a significant amount of effort on the part of the user, and in some cases may not be possible given the location of the object. In other cases, an application executing on a device can attempt to recognize all the objects in an image, but such an approach takes a significant amount of processing and power, which can be particularly undesirable for small portable devices with limited battery life.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to recognizing objects using an electronic device. In particular, various embodiments determine the gaze direction of a user to attempt to determine an object at which the user is looking. The ability to identify objects using gaze helps to minimize the search space when analyzing captured image information including the objects, which can reduce processing time and save power. Such an approach also enables a user to specify an object to be recognized, which can enable the user to obtain information about that object or, in some cases, enable the user to interact with and/or control some aspect of that object.

Various other functions and advantages are described and suggested below as may be provided in accordance with the various embodiments.

Figure 1A:
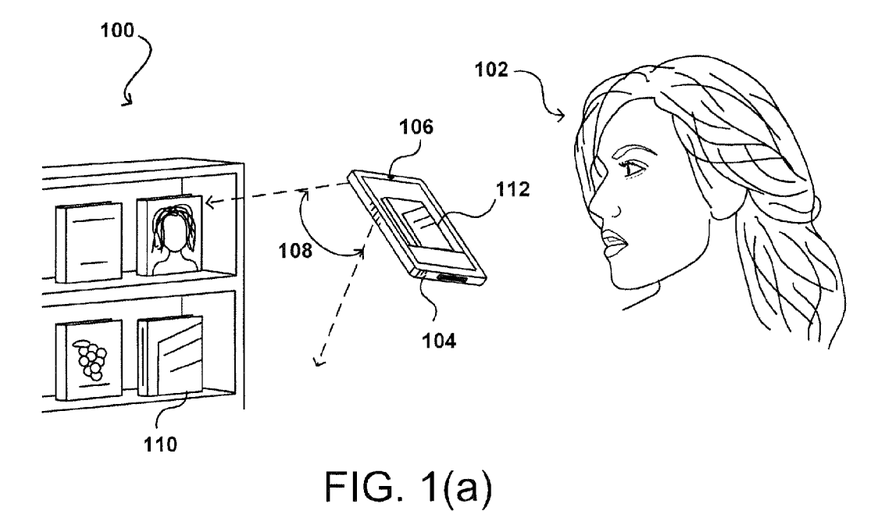
FIGS. 1(a), 1(b), 1(c), and 1(d) illustrate an example process for recognizing an object that can be utilized in accordance with various embodiments.

FIG. 1(a) illustrates an example environment 100 in which aspects of the various embodiments can be implemented. In this example, a user 102 is in a location that has a collection of books and the user is interested in obtaining information about a particular book 110. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, and portable media players, among others.

In this example, a camera 106 on the device 104 can capture image information including the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the book on the screen or drawing a bounding box around the book. In other embodiments, one or more image analysis algorithms can attempt to automatically locate one or more objects in an image. In some embodiments, a user can manually cause image information to be analyzed, while in other embodiments the image information can be analyzed automatically, either on the device or by transferring image data to a remote system or service as discussed later herein.

Figure 1B:
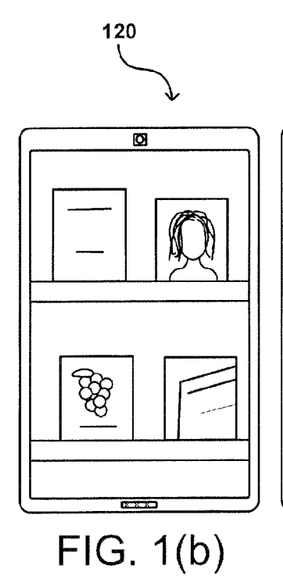

FIG. 1(b) illustrates an example view 120 that could be provided to the user in response to the device 104 capturing image information, such as live video, which can then be displayed on the display screen 112. As can be seen, the view 120 includes four books within the field of view. The device could require the user to select one of these books, or could attempt to recognize and provide information about all of these books.

Using approaches in accordance with various embodiments, the computing device 104 can determine the gaze direction of the user 102, such as by capturing and analyzing images of the user's head, face, and/or eyes, as discussed elsewhere herein. Upon determining the user's gaze direction, as well as a relative position of the user to the computing device, the computing device can correlate that gaze direction with objects in the field of view of the camera to determine that the user is gazing at a particular book 110. The particular book might be determined when the user's gaze direction is determined to point in a general direction that is substantially within the bounds of the book for at least a period of time, referred to herein as a "dwell" period. The eyes might be fixed on a portion of the book, might glance at portions within the book, or might saccade within the bounds of the book, among other such options.

Figure 1C:
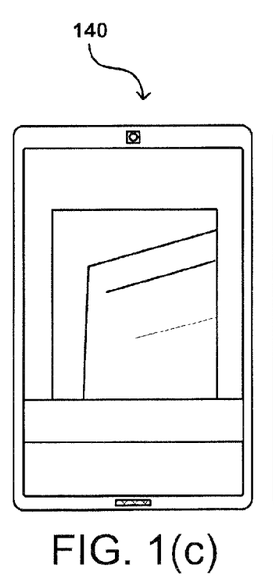
Figure 1D:
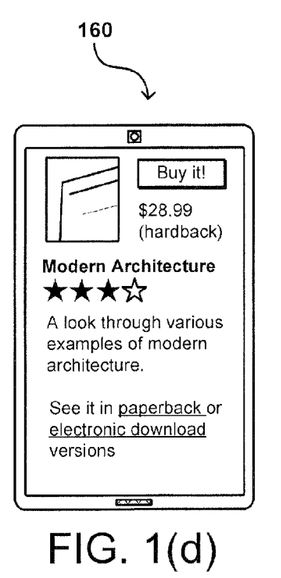

In at least some embodiments, the device might show a view 140 of the object at which the user is gazing, as illustrated in the example of FIG. 1(c). In some embodiments, this might be a still image shown for a period of time to enable the user to determine that the correct object was identified using the gaze direction. A user in some embodiments can provide an input to acknowledge the correctly determined object, or to indicate to the device that the incorrect object was selected. In other embodiments, the image portion corresponding to the identified object can be determined for analysis but not shown to the user. As can be seen, the view 140 of the single book has less extraneous information to analyze using an object recognition algorithm (or similar such process) than the view 120 that includes all four books, the shelves, etc. Once the object is recognized using such an algorithm, information about that object can be displayed, or otherwise provided, to the user.

FIG. 1(*d*) illustrates an example of a type of information that could be displayed to the user via a display screen of a computing device in accordance with various embodiments. In this example, the image captured by the user has been analyzed and related information 160 is displayed on the screen. The "related" information as discussed elsewhere herein can include any information related to an object, item, product, or other element that is matched (within at least a level of confidence) to the image data using one or more matching or identifying algorithms, or other such approaches. These can include, for example, image recognition algorithms, object identification algorithms, facial recognition algorithms, barcode detection algorithms, optical character recognition algorithms, or any other such approaches or techniques. The displayed information in this example includes the title of the located book, an image of the book (as captured by the user or otherwise obtained), pricing and description information, and review information. Also as shown are options to purchase the book, as well as options for various other versions or forms of that content, such as a paperback book or digital download. The type of information displayed (or otherwise conveyed) can depend at least in part upon the type of content located or matched. For example, a located book might include author and title information, as well as formats in which the book is available. For facial recognition, the information might include name, title, and contact information. Various other types of information can be displayed as well within the scope of the various embodiments.

Figure 2:
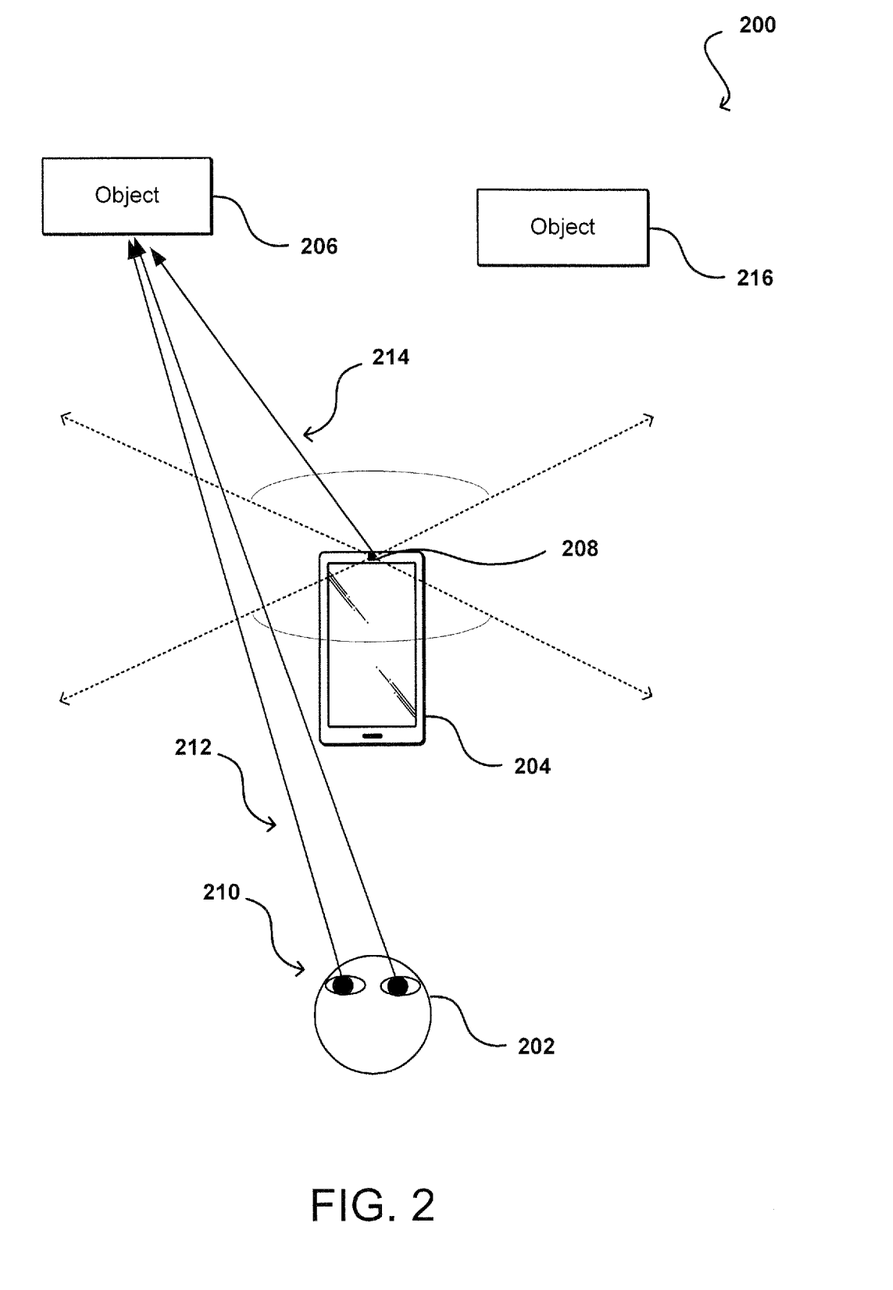
FIG. 2 illustrates an example environment in which an object can be recognized based at least in part upon a gaze direction of a user, in accordance with various embodiments.

FIG. 2 illustrates an example environment 200 in which the gaze direction of a user can be determined, in accordance with various embodiments. In this example, a user's head 202 is within the field of view of at least one camera 208 of a computing device 204. Using a single camera can enable the device to determine the relative direction of the user, and the size of the user's head in the captured image information can be used to estimate a distance to the user. In situations where there are at least two cameras, or a stereoscopic imager, operable to determine three-dimensional information, the relative position of the user's head 202 to the device 204 can be determined. The device 204 can also analyze the image information in at least some embodiments to determine the relative position of the user's eyes 210 with respect to the user's head. The eyes can be captured using ambient or infrared light, for example, in order to determine a size, shape, location, or other such aspect of the user's retina, cornea, iris, or other such aspect, which can be used to determine an approximate gaze direction 212 of the user with respect to the device. Examples of approaches to determining gaze direction and/or point of view can be found in co-pending U.S. patent application Ser. No. 13/083,303, filed Apr. 8, 2011, entitled "Gaze-Based Content Display," as well as co-pending U.S. patent application Ser. No. 13/246,561, filed Sep. 27, 2011, entitled "Point of View Determinations for Finger Tracking," each of which is hereby incorporated herein by reference.

Depending at least in part upon the relative orientation of the computing device 204, the same or at least one different camera can also capture and analyze image information to determine the relative direction and/or location of one or more objects 206, 216 with respect to the computing device 204. In this example, both objects are within the field of view of the camera 208, such that the device can determine the relative direction to each object. Again, if stereoscopic or other such information is available, the computing device can also determine the relative positions of those objects in three dimensions. In some embodiments the device might have multiple cameras, of the same or different types, at various locations on the device, and the device might select some or all of these to capture information about objects around the device. The selection can be based on factors such as the orientation of the device (e.g., cameras facing down at a desktop might not be used) and/or the gaze direction and/or orientation of the user (i.e., do not capture information for objects behind the user, or in directions which the user is not looking).

When the device 204 has determined the gaze direction 212 of the user, as well as the relative directions and/or locations of the nearby objects 206, 216, the device can do a geometric analysis to determine the object 206 at which the user is currently gazing. Using simple vector addition, for example, if the device knows the relative position of the user, the relative position of the objects, and the gaze direction of the user, the device can add the appropriate vectors to obtain the result 214 that is a vector corresponding to the location of the object at which the user is gazing. If three-dimensional information is not available or a lower resolution is acceptable, the device 204 can use two-dimensional direction information to make a similar determination. For example, in this case there is one object 216 on the right side of the device and one object 206 on the left side of the device. If the device can determine that the user is gazing to the left, that might be enough to indicate to the device that the user is likely looking at the object 206 to the left. Particularly where a user is attempting to provide input or otherwise interact with a recognized device, the device can attempt to determine the most likely object in that general direction with which the user can interact. If a decision cannot be made with an acceptable level of confidence, the device might activate an additional camera, prompt the user for a selection, or perform another such action.

In this example where the device has determined the object of interest, the device can attempt to recognize the object as discussed elsewhere herein. Upon determining a type of the object 206, the device can determine the type of interactions that the user can have with respect to that object. For example, if the object is a book that the user does not own, there might be information available that the user can obtain about the book, such as author and title, reviews, versions available, and the like. If, on the other hand, the object is an electronic device with which the computing device 204 is able to communicate, such as over at least one network, the computing device can determine which inputs or controls are available for that type of electronic device, and can provide at least a portion of those inputs or controls to the user. For example, if the electronic device is an Internet radio the computing device might enable the user to use the touch screen or other portions of the computing device to adjust a volume of the radio, change the station, turn off the device, or perform another such action. In some embodiments, a user gazing at a device to select the device can provide an audible command, perform a gesture, provide a motion, or indicate another such input that can be used to control an aspect of the device. For example, a user can say "on" to activate the device, might make an "up" motion with a hand to increase the volume, or might squeeze a pressure-sensitive portion of the device to change to the next "favorite" station, among other such actions.

Another advantage to using gaze tracking is that the user can provide such input or commands without having to otherwise specify or customize those commands for a particular device. For example, in FIG. 2 it is possible that both the objects 206, 216 are devices that are able to be turned on by the user issuing an "on" command that is detected by the computing device 204. Without gaze information, the user would have to somehow indicate to the computing device which device is to be turned on, such as by selecting a view of that object on the display screen or modifying the command to say something such as "please turn on the downstairs stereo." By instead being able to capture gaze information, the user can simply look in the direction of the device and issue a command such as "on," whereby the computing device can determine the device of interest, recognize that device, determine the necessary protocol and/or message to send to that device, and can cause that device to be activated. In some embodiments, depending on the type of device and/or action, a user gazing at that object for at least a determined dwell time can cause an action to automatically occur. For example, a user might be able to gaze towards a specific light switch and say "on" and the device can cause the light for that switch to be turned on. In another embodiment, the user might be able to instead simply gaze at that switch (or light) for a minimum dwell time, after which the computing device can issue a command or request to activate that light. Various other approaches can be used as well within the scope of the various embodiments. The use of gaze without a confirming command may not be desirable for all objects, however, as a user looking at a television might not want the television to turn off, or a user looking out the window might not want the blinds to automatically close, etc.

Figure 3A:
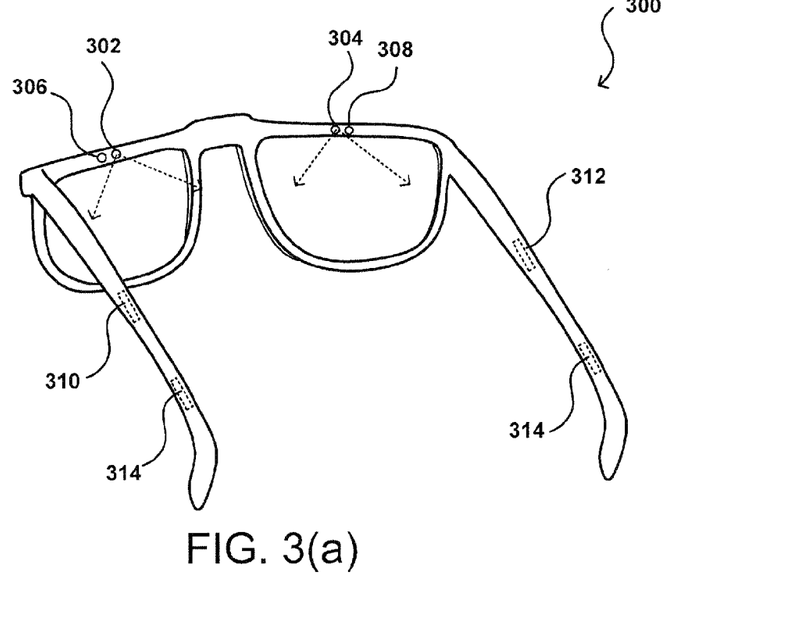
FIGS. 3(a) and 3(b) illustrate views of an example pair of glasses that can be used to recognize objects based at least in part upon a gaze direction of a user in accordance with various embodiments.
Figure 3B:
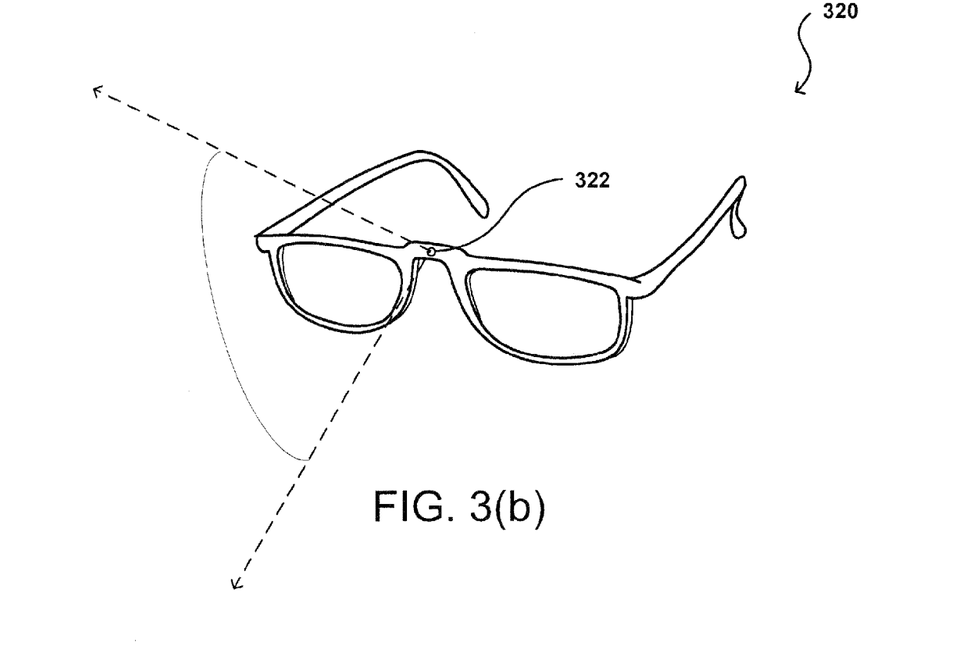

In some embodiments, a computing device might utilize a peripheral device (or other form factor) in order to be able to more accurately determine gaze information, even for times when the user is tilting his or her head, etc. For example, FIGS. 3(a) and 3(b) illustrate different perspective views 300, 320 of an example pair of glasses that can be used in accordance with various embodiments. Such glasses can have at least one camera facing the user, in order to be able to capture images or video of the user's eyes. In this example, there is an infrared (IR) emitter 306 and an IR detector 302 for the left eye, and a separate pair of an IR emitter 308 and an IR detector 304 for the left eye. IR is used because the eye reflects IR light but IR is not distracting to a user. Further, determining pupil position can be relatively straightforward using IR, as discussed in co-pending U.S. patent application Ser. No. 13/332,128, filed Dec. 20, 2011, and entitled "Conflict Resolution for Pupil Detection," which is hereby incorporated by reference herein. Although a single pair of IR emitter and detector could be used, using a pair for each eye can help to improve results and ensure that the eyes are within the field of view of the detectors. Image information can be captured by the detectors and analyzed to determine a gaze direction of the user with respect to the glasses.

As illustrated in FIG. 3(b), there can be at least one camera 322 on the front of the glasses as well. This camera can be used to capture image information about objects that might be within the user's line of sight. The image information can be captured and analyzed to determine the relative direction of one or more objects, which can be used with the gaze direction information to determine the object at which the user is gazing. In some embodiments, stereoscopic cameras or multiple cameras can be used to determine three-dimensional information about the relative positions of the objects with respect to the glasses, but in general the proximity of the glasses to the user's eyes means that the point of view will be substantially similar, such that a direction to an object from a user's eyes will be almost the same as the direction from the glasses to that object. Thus, processing needs can be reduced while using the glasses. Further, as discussed, such a device enables the gaze to be determined even when the user is turning his or her head, or might otherwise not be facing a computing device.

The glasses can have various other components as well, which can be used for different types of functionality. For example, the glasses might have one or more speakers (or earphones) 314 that can enable the glasses to provide data to the user through audio output. For example, if a user is at a party or business meeting and wants to obtain information about people in the room (e.g., name, occupation, etc.) that the user may have met previously, the user can configure the glasses (and any computing device in communication with the glasses) to provide the data through a relatively low volume audio output. Such an approach can be advantageous to looking at the data on a display screen of a computing device, as the user might want to obtain the information discretely such that the other people will not get the impression that the user does not remember them. In at least some embodiments these audio elements can also include one or more microphones that can enable the user to provide audio commands or input. In at least some embodiments, the glasses might additionally, or alternatively, use a heads-up display mechanism (HUD) to display information to the user using information projected on one or more lenses of the device, among other such options.

The example glasses also include one or more communication components 310, which can use any appropriate wireless (or potentially wired) communication technology for communicating with one or more other devices. The technology can include, for example, Bluetooth®, 3G, 4G, WiFi, RF, and other such wireless communication technologies. The communication component(s) can communicate with another computing device associated with the user, other nearby devices capable of communicating over the same communication channel, other glasses, etc. The example glasses shown also include at least one haptic feedback element 312 capable of providing haptic feedback to the user for any appropriate reason, although haptic feedback is not utilized in at least some embodiments. For example, the user might look at a person that a user knows, might look at a device that the user can control, etc. In response, the glasses might provide a short haptic feedback to inform the user that information and/or inputs are available for that object. Haptics can be used for other notifications as well, such as low power of a battery (not shown) of the glasses, an incoming notification, and the like.

In some embodiments where high resolution and/or precision might not be needed, the glasses might utilize only one or more front-facing cameras in order to identify an object, or at least narrow the search field. For example, a user might turn his or her head to the left or the right, which can give a general indication of the direction in which the user is looking. The user also can be trained to face an object of interest in such a mode if the viewing direction is to be interpreted as input, instead of just moving the user's eyes while keeping the head substantially stationary. To save power in some embodiments, a pair of glasses might first attempt to determine an object of interest based on the direction the glasses are pointing, and then activate the gaze determination components if the object cannot be determined with at least an acceptable amount of certainty. In embodiments where the direction of the glasses is used to identify objects, information from sensors in the glasses, such as position sensors (e.g., GPS), motion sensors (e.g., gyroscopes, accelerometers, etc.), and the like, can be used to determine the relative position, orientation, and/or direction of the glasses. Various other approaches can be used as well within the scope of the various embodiments.

In some embodiments a user might wear an earpiece or headset, rather than glasses, which can include at least a portion of this functionality. For example, the headset can include a microphone, speakers, and potentially haptic feedback elements, as well as communication elements, in order to enable the user to communicate with the computing device and receive information or notifications from the device. In at least some embodiments, the headset or earpiece might also include a camera that can be used to capture image information to determine a direction which the user's head is facing. The device might also, or alternatively, include one or more position and/or motion sensors for enabling a determination of the orientation of the device. Various other combinations or configurations can be used as well within the scope of the various embodiments.

Figure 4:
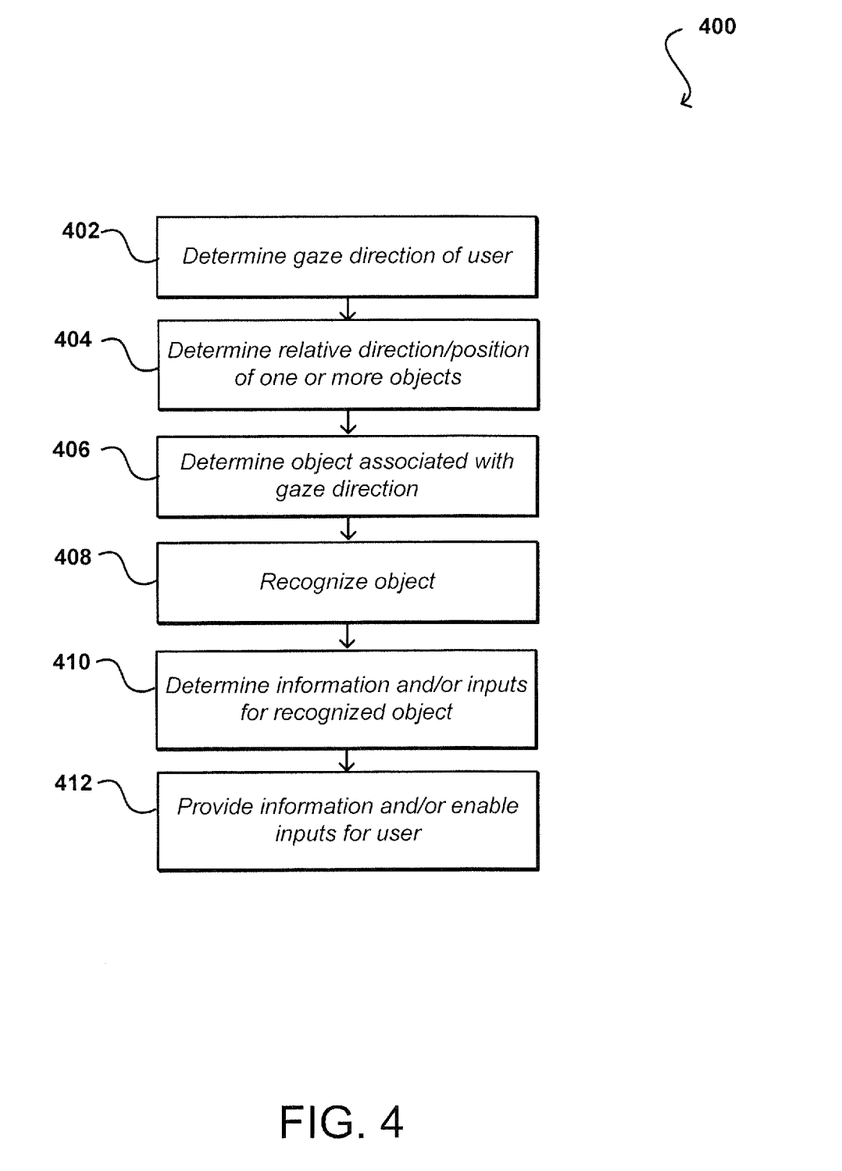
FIG. 4 illustrates an example process for recognizing an object that can be used in accordance with various embodiments.

FIG. 4 illustrates an example process 400 for recognizing objects based at least in part upon gaze determination that can be utilized in accordance with various embodiments. It should be understood that there can be additional, fewer, or alternative steps performed in similar or alternative orders, or in parallel, within the scope of the various embodiments unless otherwise stated. In this example, the gaze direction of a user is determined 402. As discussed, this can be determined in at least some embodiments by capturing image information (e.g., still or video using ambient or IR light) including the user's eyes, and analyzing the position of the eyes in the image information to determine a direction the user is looking, glancing, or gazing, each of which can depend upon the amount of time the user spends looking at a particular object. As discussed, in other embodiments head position and/or orientation can be used to attempt to determine where the user is looking, either alone or in combination with gaze tracking. If a user looks at an object for at least a minimum amount of time, such as at least two seconds, the user can be considered to be gazing at the object. The relative directions and/or locations of one or more objects can also be determined 404, such as by also capturing image information in directions away from the user and detecting one or more objects within the image information. Based at least in part upon the determination of object location and gaze direction, an object can be identified 406 that corresponds to the user's gaze direction. As discussed, this can involve vector addition or other such geometric calculations. Once the object of interest has been located, one or more object recognition processes can be executed to attempt to recognize the object 408, such as to determine a type of the object, determination of the specific instance of the object, and the like. Once the object, or type of object, is recognized, a determination can be made 410 as to whether there is information available for the object, as well as whether the object is a device with which a user can communicate to provide one or more inputs and/or receive information. Based at least in part upon this determination, the information about the object can be provided 412 or otherwise made available to the user, and if interaction with the object is possible the user can be provided with the ability to provide input to, or receive information from, the object.

As discussed, a user can provide commands that can be used to control a device, such as by gazing at a network-connected light switch and saying "on," or using another such approach. For devices such as televisions or stereos, for example, there can be multiple actions or inputs that can be performed. For at least some of these devices, a computing device can attempt to download or otherwise obtain information about a control scheme for that device, and can provide at least some of these control options to the user. In a television example, the computing device might download the control scheme and display options for controlling the device that enable the computing device to function as a virtual remote control for the device. In some embodiments, the device might be able to locate an image, or description of an image, of a remote control for that television and display or render that image on a display screen of the computing device. The user can then touch (or otherwise select) one of the displayed buttons or options on the remote control image that the computing device can interpret and then use to send an appropriate command to the television over an appropriate network, wireless channel, etc. Such an approach in some embodiments can enable a user to also generate custom keys or functions that might not be available on the conventional remote for the television. For example, a user might have two favorite channels: one that is available in high definition, and one that is available in standard definition. A user could use the computing device to create a button that changes the channel and the resolution, when necessary, for at least one of these channels, effectively combining two or more buttons into one. If the television has different modes, such as theater mode or sports mode that affects contrast and brightness settings, the custom button can also be configured to select the appropriate mode. Various other options can be added or configured as well within the scope of the various embodiments.

Figure 5:
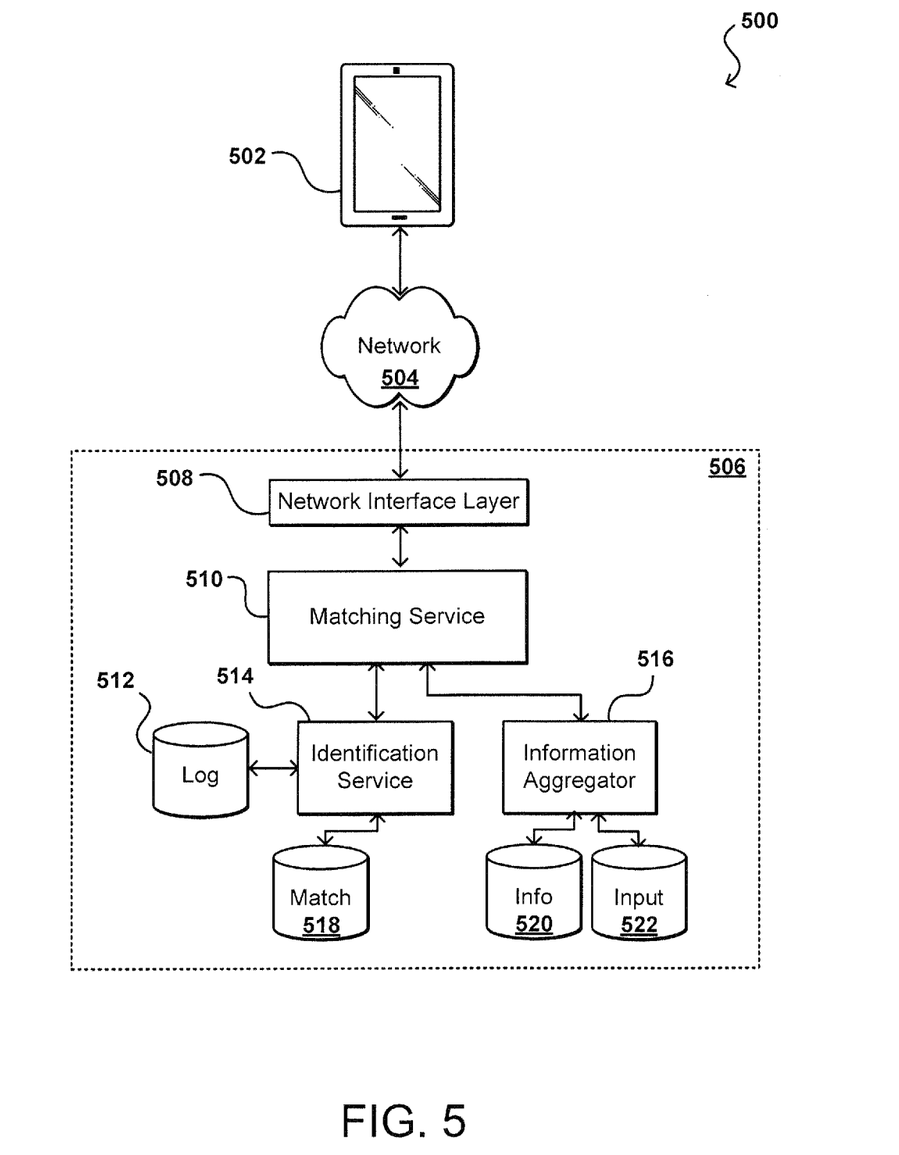
FIG. 5 illustrates an example system that can be used to implement aspects of the various embodiments.

FIG. 5 illustrates an example system 500 in which information for a determined object can be located in accordance with various embodiments. In this example, a user is able to designate an object of interest by gazing at the object, where the gaze direction is used by a computing device 502 to determine the object of interest as discussed elsewhere herein. The device 502, automatically or in response to user input, can send information pertaining to the object across at least one appropriate network 504 to attempt to obtain description, inputs, or other information pertaining to the object of interest. The network 504 can be any appropriate network, such as may include the Internet, a local area network (LAN), a cellular network, and the like. In some embodiments, the device might analyze the information for the object to determine information such as a type of the object and/or actions that can be performed with that type of object, and might send information about the type of object and/or actions across the network in order to obtain information about applications or services, for example, that are not currently available on the computing device 502. In other embodiments, the computing device itself might be able to determine at least some of the description, inputs, or other information pertaining to the object of interest, without having to transfer any data to a remote source.

The request in this example can be sent to an appropriate content provider 506, as may provide one or more services, systems, or applications for processing such requests. The information can be sent by streaming or otherwise transmitting data as soon as it is obtained by the device and/or ready for transmission, or can be sent in batches or through periodic communications, etc. In this example, the request is received to a network interface layer 508 of the content provider 506. The network interface layer can include any appropriate components known or used to receive requests from across a network, such as may include one or more application programming interfaces (APIs) or other such interfaces for receiving such requests. The network interface layer 508 might be owned and operated by the provider, or leveraged by the provider as part of a shared resource or "cloud" offering. The network interface layer can receive and analyze the request, and cause at least a portion of the information in the request to be directed to an appropriate system or service, such as a matching service 510 as illustrated in FIG. 5. A matching service in this example includes components operable to receive data about an object, such as digital image or video data, analyze the data, and return information relating to people, products, places, things, or other items that are determined to match objects in that data.

The matching service 510 in this example can cause information to be sent to at least one identification service 514, device, system, or module that is operable to analyze the data and attempt to locate one or more matches for objects reflected in the data. In at least some embodiments, an identification service 514 will process the received data, such as to extract points of interest or unique features in a captured image or video portion, for example, then compare the processed data against data stored in a matching data store 520 or other such location. In other embodiments, unique feature points, image histograms, text, or other such information about an image can be generated on the device and uploaded to the matching service, such that the identification service can use the processed information to perform the match without a separate image analysis and feature extraction process. Certain embodiments can support both options, and combinations thereof, among others. The data in an object matching data store 518 might be indexed and/or processed to facilitate with matching, as is known for such purposes. For example, the data store might include a set of histograms or feature vectors instead of a copy of images to be used for matching, which can increase the speed and lower the processing requirements of the matching. Approaches for generating information to use for such matching are well known in the art and as such will not be discussed herein in detail.

The matching service 510 can receive information from each contacted identification service 514 as to whether one or more matches could be found with at least a threshold level of confidence, for example, and can receive any appropriate information for a located potential match. The information from each identification service can be analyzed and/or processed by one or more applications of the matching service, such as to determine data useful in obtaining information for each of the potential matches to provide to the user. For example, a matching service might receive bar codes, product identifiers, or any other types of data from the identification service(s), and might process that data to be provided to a service such as an information aggregator service 516 that is capable of locating applications, services, or other items that might be relevant to the identified object.

In at least some embodiments, an information aggregator 516 might be associated with an entity that provides an electronic marketplace, or otherwise provides applications or content for consumption (e.g., purchase, rent, lease, or download) by various customers. Although products and electronic commerce may be presented in this and other examples presented, it should be understood that these are merely examples and that approaches presented in the present disclosure can relate to any appropriate types of objects or devices as discussed and suggested elsewhere herein. In such an instance, the information aggregator service 516 can utilize the aggregated data from the matching service 510 to attempt to locate products that are offered through the marketplace and that are related to the object. The information aggregator service 516 can, upon locating a matching product, locate information about that product in an information data store 520 or other such location, and can attempt to locate actions or inputs that can be used with respect to the object from an input data store 522 or other such location. As discussed, the input data can include control schemes and images as well as protocols and commands that are able to be accepted by the object. Other types of information can be determined as well as discussed elsewhere herein. Information for matching products can be stored in a log data store 512 or other such location, which can be used to assist in determining future potential matches or suggestions that might be of interest to various users. Various other types of information can be returned as well within the scope of the various embodiments.

It should be understood that, although the identification services are shown to be part of the provider environment 506 in FIG. 5, that one or more of these identification services might be operated by third parties that offer these services to the provider. For example, an electronic retailer might offer an application that can be installed on a computing device for identifying objects. When a user transfers information about an object, for example, the provider could forward this information to a third party who has software that specializes in identifying objects. The provider could then match the results from the third party with products from the retailer's electronic catalog in order to return the intended results to the user.

In some embodiments, the user can request specific information about an object. For example, a user could gaze at a person and ask a question such as "who is that?" which the device could analyze using voice recognition. The appropriate computing device could then provide the user with the requested information, such as name, title, position, relation to the user, or other such information. In some embodiments the type of information could also be based at least in part upon the context. For example, if the user is at work the identification information for a person might include professional information such as their title and company. If the user views the same person while in an entertainment venue, on the other hand, the information might include social information such as the person's name, spouse and children names, activities or hobbies, or other such information.

The context can be determined in any of a number of ways. For example, the device might include a GPS or have access to cellular triangulation information that can be used to determine a present location of the user. The device could alternatively, or additionally, capture image information indicating a name of the store or location. The device can then potentially determine a type of location, such as an electronics store, amusement park, user's home, etc. The device then can attempt to determine information that is relevant for that context. For example, if the user is gazing at a television in an electronic store, the device might provide purchasing related information, such as suggested retail price, reviews, warranty information, and the like. If, on the other hand, that user is gazing at the same model television in the user's home, the device might provide information such as upcoming shows, virtual remote control inputs, etc.

In some embodiments, a device might be able to determine an object of interest without the device capturing image information of the object. For example, if the user is outside and is facing a building or monument, the device can use information such as the coordinates of the device and the orientation of the device (as may be determined using a GPS and an electronic compass, respectively) to determine a direction the user is facing from a current location, which can be compared with map information to determine that the user is facing that building or monument. Similarly, if the user is in the user's home and the device has built a 31) model of the user's home, the device can potentially use location and direction information to determine the object in which the user is likely interested. Various other approaches can be utilized as well within the scope of the various embodiments.

In some embodiments, a device might indicate to a user which object the device thinks the user is interested in, before obtaining and/or providing information about that object. For example, the device can display an image of the object on a display screen, and can display a bounding box or other indication that the device has determined that object to be of interest to the user. In order for the user to view the box the user could look away from the object, so the image of the object could be displayed for a period of time, such as 3-5 seconds, after which the image would go away and no information would be provided unless the user provided an acknowledgement. If the user is interested in that object, the user can provide an acknowledgment by making a gesture, nodding the user's head "yes" or "no," speaking a voice command, blinking the user's eyes, tapping the display screen, squeezing the computing device, or performing another such action. In some embodiments, if the user is wearing a device for gaze tracking and has a phone in his or her hand or pocket, the user might squeeze or tap the phone to indicate that the user wants more information about the selected object.

In some embodiments, the type of action taken by the user can also indicate the type of information to be provided. For example, if the user is interested in information about the object, the user might flick the device, which could be picked up by a sensor such as a gyroscope or inertial sensor. If the user instead wants control options for the device, the user might squeeze the device, as might be detected by at least one pressure-sensitive element of the device.

In some embodiments, a user might be able to indicate or train the device to provide certain information or inputs for certain types of objects. For example, a user could manually specify that the device should provide information about the user's upcoming appointments when the user gazes at a clock for a period of time. Alternatively, the user might always ask for schedule information after gazing at a clock, and the device can learn to provide that type of information in response to the user gazing at that type of object.

Figure 6A:
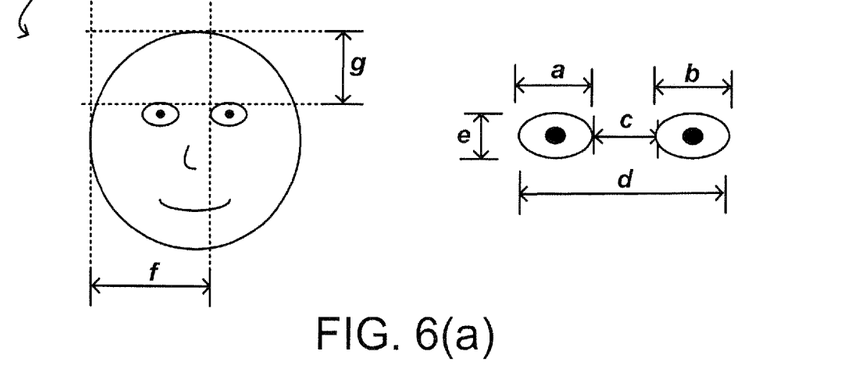
FIGS. 6(a), 6(b), and 6(c) illustrate examples of ways to determine gaze direction that can be utilized in accordance with various embodiments.
Figure 6B:
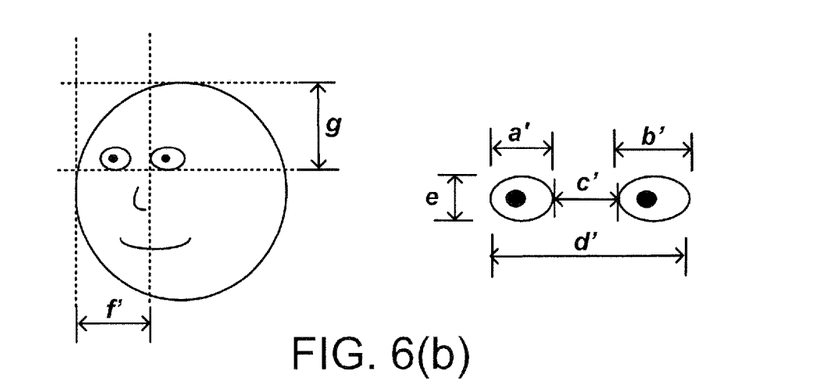
Figure 6C:
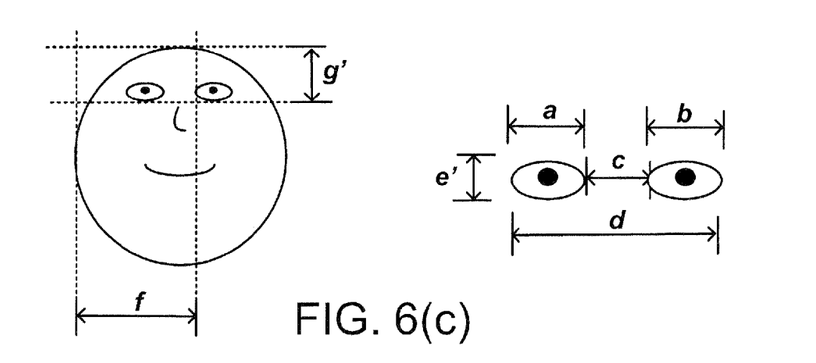

In order to determine the gaze direction of a user for such a process, a device in at least some embodiments has to determine the relative position of the user relative to the device, as well as dimensions or other aspects of the user at that position. FIG. 6(*a*) illustrates an example 600 wherein images are captured and analyzed to determine the relative positions of the user's head and the user's eyes. In a system wherein the algorithm is able to differentiate the user's pupils, the system can also utilize the relative position of the pupils with respect to the eye position. For example, FIG. 6(*b*) illustrates a case where the user is looking "left" (or to the user's right"), such that a center point of each user's pupil is to the left (in the image) of the center point of the respective eye. Similarly, FIG. 6(*c*) illustrates a case where the user is looking "up". As can be seen, the positions of the pupils have moved above a center point of the eyes. The position of the pupils can change without the user moving his or her head. Thus the system may be able to, in some embodiments, detect a glance without a change in head position. A system in accordance with one embodiment can take advantage of such information by adjusting the display of the computing device according to the detected position of the user's pupils relative to the user's eyes, and thus the determined area on the display at which the user is looking. A system can also detect movements such as a user closing his or her eyes for an extended period of time, wherein the device can perform an action such as placing an electronic book reader in a "sleep" or power-limiting mode, deactivating image capture, or powering off the device. A system in some embodiments can differentiate between different types of movement, such as between eye tremor, smooth tracking, and ballistic movements. In some embodiments, a user can provide specific input though various eye gestures, such as for a glance or gaze associated with a specific ballistic movement. A system could also require no ballistic movement in a continued gaze for certain input or actions, such as to enable a user to obtain additional information of the current type.

Figure 7:
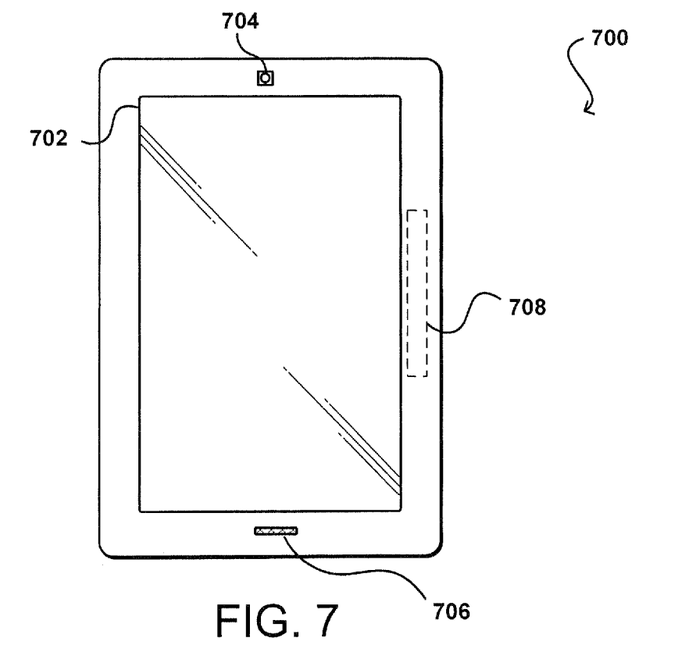
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device, music playing near the device, etc. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device. In some embodiments, a device can start analyzing image information when movement of the device is detected using one of these sensors. In other embodiments, a user can provide input to the device by tilting the device, shaking the device, or performing another such motion or action.

Figure 8:
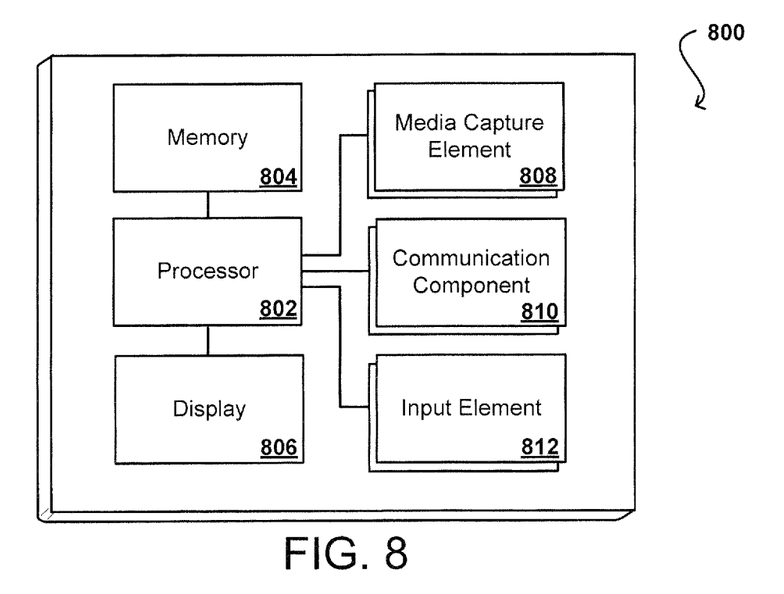
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one media capture element 808 such as a camera or infrared sensor that is able to image projected images or other objects in the vicinity of the device, or an audio capture element able to capture sound near the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can include at least one mono or stereo microphone or microphone array, operable to capture audio information from at least one primary direction. A microphone can be a uni- or omni-directional microphone as known for such devices.

In some embodiments, the computing device 800 of FIG. 8 can include one or more communication components 810, such as a Wi-Fi, Bluetooth, RF, wired, or wireless communication system. The device in many embodiments can communicate with a network, such as the Internet, and may be able to communicate with other such devices. In some embodiments the device can include at least one additional input element 812 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

Figure 9:
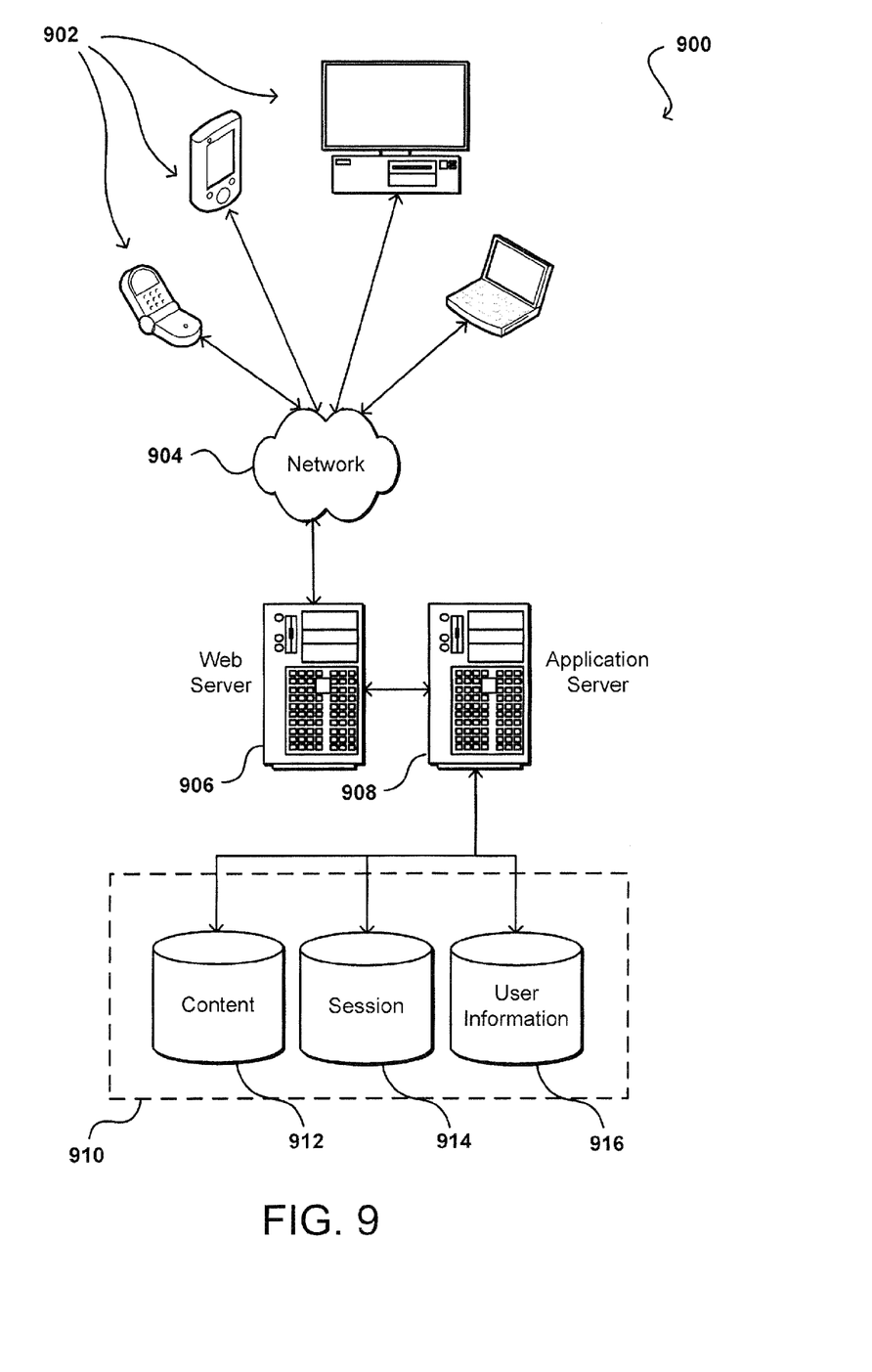
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for recognizing at least one object, comprising:
    capturing a first image including at least a portion of a face of a user using a first camera on a first side of a computing device, the face is within a first field of view of the computing device;
    capturing a second image including at least one object using a second camera on a second side of the computing device, the at least one object is within a second field of view of the computing device that is different than the first field of view;
    determining, using at least one processor of the computing device and based at least in part upon where the face is in the first field of view, that the face is directed toward the at least one object;
    determining, based at least in part upon the second image, a location of the at least one object;
    obtaining information for the at least one object;
    providing the information for the at least one object to the user;
    receiving, via a user command, a selection associated with the information; and
    causing the at least one object to be operated.

2. The computer-implemented method of claim 1, wherein the at least one object is an electronic device with which the computing device is able to communicate over at least one communication channel, and
    wherein the information indicates at least one command enabling the user to provide input to the electronic device using the computing device.

3. The computer-implemented method of claim 2, wherein providing the information to the user includes providing a control scheme via the computing device, the control scheme enabling the computing device to function as a control mechanism for the electronic device.

4. The computer-implemented method of claim 2, further comprising:
    determining a duration of time that the face is directed toward the at least one object; and
    initiating the recognizing of the at least one object after the duration exceeds a threshold value.

5. The computer-implemented method of claim 2, wherein the at least one object includes a book, and wherein the information for the recognized at least one object includes at least title and author information.

6. A computer-implemented method, comprising:
    under control of one or more computing systems configured with executable instructions,
    determining, using at least one processor of the computing device and based at least in part on a relative position of a user in a first field of view of the computing device, that a face of a user is directed toward an object;
    determining the object is within a second field of view of the computing device, the first field of view and the second field of view are different;
    recognizing a characteristic of the object;
    obtaining information associated with the object;
    providing the information;
    receiving, via a user command, a selection associated with the information; and
    causing the object to be operated.

7. The computer-implemented method of claim 6, further comprising:
    capturing video using at least one camera, the video including at least a portion of the face of the user;
    locating position information for the user's eyes in the video; and
    determining that the face of the user is directed toward the object based at least in part upon the position information for the user's eyes.

8. The computer-implemented method of claim 7, wherein the at least one camera includes a single digital camera, a plurality of digital cameras adapted to capture stereoscopic images, or at least one infrared-capable camera.

9. The computer-implemented method of claim 7, wherein the at least one camera is located on the computing device or on a pair of glasses worn by the user, the pair of glasses including a communication mechanism enabling the pair of glasses to communicate with the computing device.

10. The computer-implemented method of claim 9, wherein the pair of glasses includes one infrared emitter and one infrared sensor for each eye of the user.

11. The computer-implemented method of claim 9, wherein the pair of glasses communicate the information to the user using one or more speakers of the pair of glasses or a heads-up display provided on at least one lens of the pair of glasses.

12. The computer-implemented method of claim 9, wherein the at least one camera is located on the computing device and the computing device communicates the information to the user using at least one of a display of the computing device or one or more speakers of the computing device.

13. The computer-implemented method of claim 6, wherein the object is an electronic device, and wherein the information indicates at least one input enabling the user to adjust at least one functional aspect of the electronic device.

14. The computer-implemented method of claim 6, wherein the object is identified using at least one of an image recognition algorithm, a facial recognition algorithm, a pattern recognition algorithm, a barcode detection algorithm, or an optical character recognition algorithm.

15. The computer-implemented method of claim 6, further comprising:
capturing image information of at least one object within a field of view of at least one camera; and
determining a location of each of the at least one object.

16. The computer-implemented method of claim 15, wherein the at least one camera includes a single digital camera or a plurality of digital cameras adapted to capture stereoscopic images.

17. The computer-implemented method of claim 15, wherein the at least one camera is located on the computing device or on a pair of glasses worn by the user, the pair of glasses including a communication mechanism enabling the pair of glasses to communicate with the computing device.

18. The computer-implemented method of claim 6, further comprising receiving a specified input corresponding with the object.

19. The computer-implemented method of claim 18, wherein the specified input includes at least one of a motion, a gesture, an audio command, or a physical input to the computing device.

20. The computing device of claim 19, wherein the at least one camera includes at least one of at least one digital camera, a plurality of cameras for capturing stereoscopic images, or at least one infrared-capable camera.

21. The computer-implemented method of claim 6, further comprising estimating that the face of the user is directed toward the object is based at least in part upon a direction of a head of the user.

22. A computing device, comprising:
a processor;
at least one camera; and
a memory device including instructions that, when executed by the processor, cause the computing device to:
determine, using at least a first image captured by the at least one camera, and a relative position of a user in the first image, that a face of the user is directed toward an object;
recognize a characteristic of the object, using at least a second image, to obtain information about the object;
provide the information;
receive, via a user command, a selection associated with the information; and
cause the object to be operated.

23. The computing device of claim 22, further comprising providing at least a portion of the at least the second image to a service configured to perform at least one of image matching or object recognition on the at least the second image in order to identify the object.

24. The computing device of claim 22, wherein a location of the object and that the face of the user is directed toward the object is determined based at least in part upon a relative orientation of the computing device to the user and the object.

25. A non-transitory computer-readable storage medium including instructions that, when executed by a processor of a computing device, cause the computing device to:
capture a first image including at least a portion of a face of a user using a first camera on a first side of the computing device, the face is within a first field of view of the computing device;
capture a second image including an object using a second camera on a second side of the computing device, the object is within a second field of view of the computing device that is different than the first field of view;
determine, based at least in part upon where the face is in the first field of view, that the face is directed toward the object;
determine, based at least in part upon the second image, a location of the object;
obtain information associated with the object;
provide the information associated with the object to the user;
receive, via a user command, a selection associated with the information; and
cause the object to be operated.

26. The non-transitory computer-readable storage medium of claim 25, further comprising determining saccade of the eyes of the user corresponding to positions within a boundary of the object for at least a period of time.

27. The non-transitory computer-readable storage medium of claim 25, wherein the object is an electronic device, and wherein the information indicates at least one input enabling the user to adjust at least one functional aspect of the electronic device.

* * * * *